United States Patent
Schroeder

(10) Patent No.: US 6,695,088 B2
(45) Date of Patent: Feb. 24, 2004

(54) AIR MANAGEMENT SYSTEM FOR A MOTORCYCLE

(75) Inventor: Tony Schroeder, Huntington Beach, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/893,942

(22) Filed: Jun. 28, 2001

(65) Prior Publication Data

US 2003/0000755 A1 Jan. 2, 2003

(51) Int. Cl.⁷ .............................. B62M 7/00; B60K 13/02
(52) U.S. Cl. ....................................... 180/229; 180/68.3
(58) Field of Search ............................... 180/229, 219, 180/68.1–68.3; 165/41, 42; 296/208

(56) References Cited

U.S. PATENT DOCUMENTS

| | | | |
|---|---|---|---|
| 4,010,812 A | | 3/1977 | Bothwell |
| 4,321,978 A | | 3/1982 | Tominaga et al. |
| 4,445,587 A | * | 5/1984 | Hillman ...................... 180/229 |
| RE31,994 E | | 10/1985 | Tominaga et al. |
| 4,570,740 A | | 2/1986 | Hara |
| 4,577,720 A | | 3/1986 | Hamane et al. |
| 4,582,158 A | | 4/1986 | Hamane |
| 4,589,512 A | | 5/1986 | Yamaguchi |
| 4,618,020 A | * | 10/1986 | Noda et al. ................. 180/229 |
| 4,633,965 A | | 1/1987 | Tsurumi et al. |
| 4,793,293 A | * | 12/1988 | Minami ...................... 123/41.7 |
| 4,830,135 A | | 5/1989 | Yamashita |
| 5,301,767 A | | 4/1994 | Shiohara |
| 5,566,746 A | | 10/1996 | Reise |
| 6,105,701 A | | 8/2000 | Buell |
| 6,267,193 B1 | | 7/2001 | Buell |
| 6,276,482 B1 | * | 8/2001 | Moriya et al. .............. 180/229 |
| 6,422,332 B1 | | 7/2002 | Takata et al. |
| D461,157 S | | 8/2002 | Myers et al. |

FOREIGN PATENT DOCUMENTS

| | | |
|---|---|---|
| JP | 61-122180 | 8/1986 |
| JP | 62-11273 | 3/1987 |
| JP | 5-201375 | 8/1993 |
| JP | 5-330470 | 12/1993 |
| JP | 6-171568 | 6/1994 |
| JP | 2725185 | 12/1997 |
| JP | 2576872 | 5/1998 |

OTHER PUBLICATIONS

Web Pages (15 sheets) from www.tornadobenelli.com.

* cited by examiner

Primary Examiner—Lesley D. Morris
Assistant Examiner—Matthew Luby
(74) Attorney, Agent, or Firm—Rankin, Hill, Porter & Clark LLP; Christen Millard

(57) ABSTRACT

An air management system for a motorcycle including a first air channel and a second air channel. The first air channel defines a first passageway extending through a body of the motorcycle, the first passageway having an inlet located on a first side of the motorcycle and an outlet located under a seat of the motorcycle. The second air channel defines a second passageway passing through the body of the motorcycle, the second passageway having an inlet located on a second side of the motorcycle and an outlet in communication with an engine air inlet. The first and second passageway inlets are relatively symmetrically disposed relative to a longitudinal axis of the motorcycle. The first air passageway delivers cooling air to a radiator that is disposed beneath the motorcycle seat, while the second air passageway delivers air to the engine air inlet. An air filter is disposed in a terminal portion of the second air channel and is oriented relatively transverse to the motorcycle axis.

17 Claims, 1 Drawing Sheet

AIR MANAGEMENT SYSTEM FOR A MOTORCYCLE

BACKGROUND OF THE INVENTION

The present invention is directed toward a system for managing air in a motorcycle and, more particularly, toward a system for managing cooling air and engine air in a motorcycle.

Motorcycle radiators have traditionally been located at the front of the engine and relatively behind the front tire. While this places the radiator at a location to receive cooling air during operation of the motorcycle, it also places the radiator at a location to be heated by the engine exhaust manifold. Moreover, despite the forward location of the radiator, the flow of cooling air is blocked by the front tire. Accordingly, the size of the radiator must be increased to obtain satisfactory cooling performance. This, in turn, increases the front profile of the motorcycle, which not only has a negative effect on the appearance of the motorcycle, but also increases the motorcycle drag.

Moreover, air inlets for the engine are traditionally located rearwardly relative to the radiator. However, it is important that these inlets be positioned so that the heated air from the radiator does not enter the engine. Moreover, the air inlets require an air filter to remove dirt and particulates from the air stream prior to delivery to the engine. These competing requirements typically place the air filter in a difficult position for replacement and also conventionally requires a separate housing to secure the air filter in place.

Therefore, there exists a need in the art for a cooling system that places the radiator in a more advantageous position, and for an air management system that delivers air to the radiator as well as the engine.

SUMMARY OF FHE INVENTION

The present invention is directed toward a motorcycle air management system that delivers cooling air to a rear mounted radiator and delivers air to the engine. The present invention is further directed toward an air management system that provides an easily accessible and replaceable air filter.

In accordance with the present invention the air management system includes a first air channel and a second air channel, each of the first and second air channels having an inlet disposed toward a front of the motorcycle and an outlet disposed rearward relative to the inlet. The first air channel is disposed on a first side of the motorcycle and extends through a body of the motorcycle to the first air channel outlet, which is located behind and beneath a seat of the motorcycle. The second air channel is disposed on a second side of the motorcycle and extends through the body of the motorcycle to the second air channel outlet, which is in communication with an engine air inlet.

In further accordance with the present invention, the first and second air channel inlets are symmetrically disposed relative to a longitudinal axis of the motorcycle. The first air channel communicates cooling air to a radiator that is disposed behind and beneath the motorcycle seat. Preferably, cooling air flows from the first air channel outlet and through the radiator. The healed air from the radiator exits the motorcycle body at a location upwardly adjacent a rear wheel of the motorcycle.

In further accordance with the present invention, the second air channel extends from the second air channel inlet rearwardly beyond the gas tank, and has an air filter disposed therein. The air filter is preferably cylindrical and oriented transverse the longitudinal axis of the motorcycle.

BRIEF DESCRIPTION OF THE DRAWINGS

These and further features of the invention will be apparent with reference to the following description and drawings, wherein.

DETAILED DESCRIPTION OF THE PREFERRED EMBODIMENT

Figure 1:
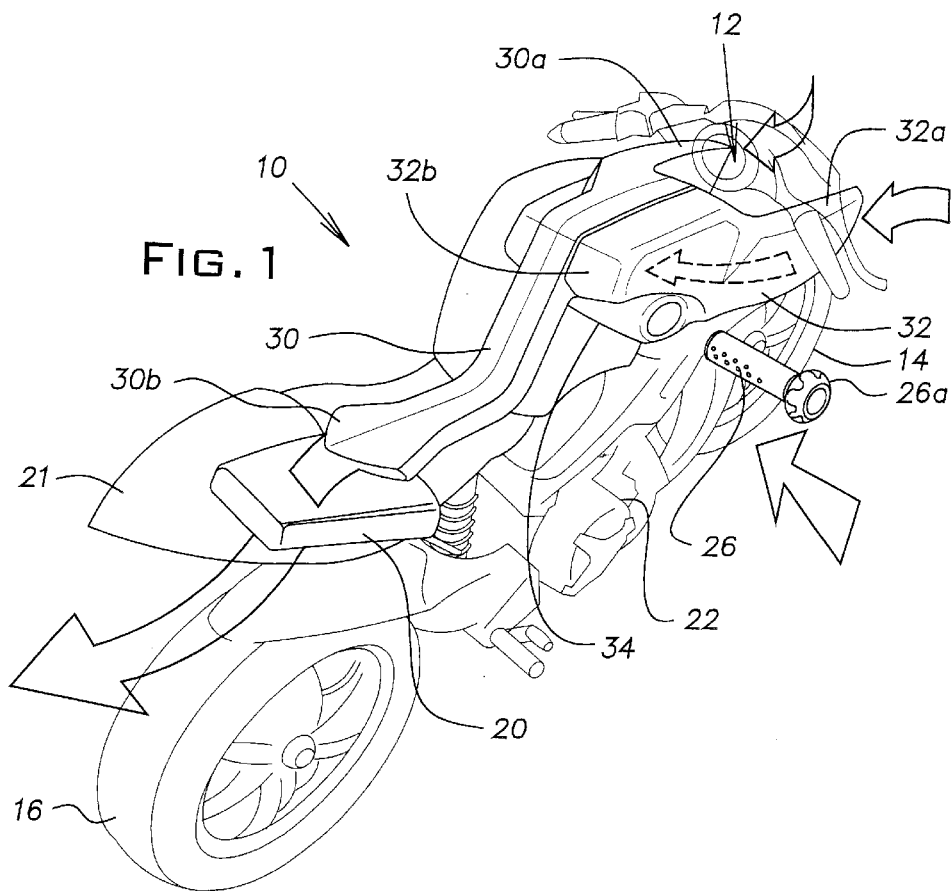
FIG. 1 is a schematic perspective view of a motorcycle incorporating an air management system according to the present invention; and, FIG. 2 is a schematic top plan view of the motorcycle illustrated in FIG. 1.
Figure 2:
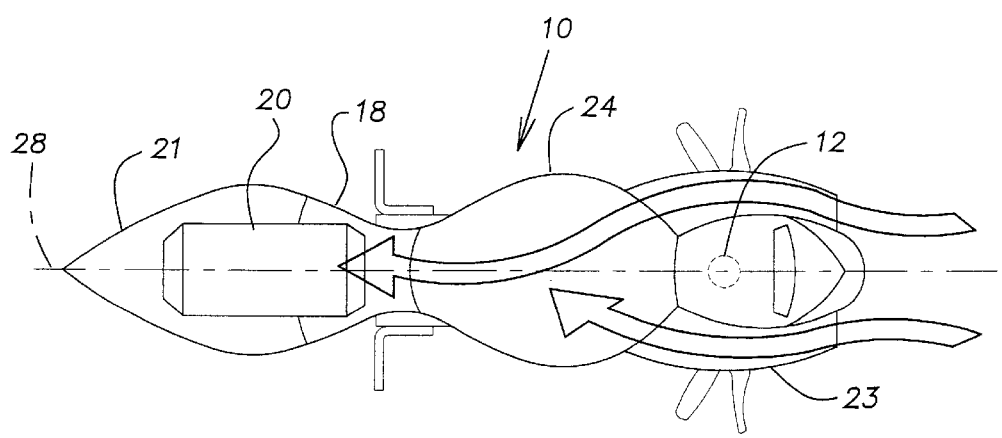

With reference to the drawing figures, an air management system according to the present invention is shown incorporated into a motorcycle 10. The motorcycle 10 includes a body having a steering head 12, a front wheel 14, a rear wheel 16, a seat or saddle 18, a radiator 20, an engine 22, and a gas tank assembly 24. With the exception of the radiator 20 and the air management system, the construction of the motorcycle 10 is generally conventional and will only be discussed in detail hereinafter as it relates to the inventive structure. The motorcycle 10 has a longitudinal axis 28 about which the motorcycle 10 is generally laterally symmetrical. The gas tank assembly 24 is aligned with the axis 28 and disposed relatively forward of the seat or saddle 18. The engine 22 is disposed relatively beneath the gas tank assembly 24, and is mechanically interlinked in a known fashion to the rear wheel 16. The steering head 12 and front wheel 14 are ahead of the gas tank assembly 24, while the rear wheel 16 is disposed relatively beneath and behind the seat 18. In the illustrated and preferred embodiment, the radiator 20 is disposed rearward of the gas tank assembly 24 and the engine 22 and relatively beneath the seat 18 and relatively above the rear wheel 16. As shown in FIGS. 1 and 2, a portion of the radiator is disposed rearward of the seat 18. More specifically, a portion of the radiator 20 is disposed in a space between the rear cowling 21 and the rear wheel 16. Insulation, if necessary, may be provided under the seat 18 to prevent heat migration to the rider as may occur when the motorcycle 10 is stopped.

The air management system includes a first air channel 30 and a second air channel 32 that each define a passageway for the communication of air from the forward portion of the motorcycle 10 to a relatively rearward location of the motorcycle, to be discussed more fully hereinafter. Each of the air channels 30, 32 has an inlet 30a, 32a and an outlet 30b, 32b. The inlet 30a of the first air channel 30 is disposed on a first side of the motorcycle longitudinal axis 28, while the inlet 39a of the second air channel 32 is disposed on a second, opposite side of the motorcycle longitudinal axis 28. The outlet 30b of the first air channel 30 is disposed at a location relatively beneath the rear cowling 21, rearward relative to the motorcycle seat 18, and relatively above the radiator 20. Thus, the first air channel 30 travels beneath the gas tank cover and the seat 18 as it extends rearwardly from the inlet 30a toward the outlet 30b. The outlet 32b of the second air channel 32 is disposed relatively beneath the gas tank assembly 24 and in-line with the engine 22, as will be discussed further hereinafter.

The air channel inlets 30a, 32a are preferably disposed relatively forward of the steering head 12 and extend under and through a front cowling 23. Screens (not shown) are preferably disposed within the air channels 30, 32, relatively rearward of the inlets 30a, 32a. As will be appreciated by one skilled in the art of motorcycle design, the air channels 30, 32 are secured by mechanical fasteners to the motorcycle frame.

Air flows through the passageway of the first air channel 30 from the inlet 30a to the outlet 30b and then flows across and downwardly through the radiator 20 to cool the liquid therein. Heated air from the radiator 20 exits downwardly toward the rear wheel 16 and relatively away from the rider. Naturally, it is contemplated and expected that the orientation of the radiator 20 relative to the first air channel outlet 30b could be adjusted so that the air flows vertically upward or laterally through the radiator 20, in dependence upon the radiator orientation. For example, the radiator 20 could be oriented vertically or diagonally instead of the illustrated generally horizontal orientation. Finally, the longitudinal position of the radiator 20 relative to the seat 18 may be altered to accommodate various design considerations.

The second air channel 32 delivers air to engine air inlets via an air filter 26. As shown best in FIG. 1 the air filter 26 is disposed in a terminal portion of the second air channel 32. The illustrated air filter 26 is cylindrical in shape and has a closed proximal end 26a and an open distal end, the distal end being adjacent the engine air inlet. The outer surface of the closed proximal end 26a of the air filter 26 is exposed to the exterior and preferably integrally provides a fastener that cooperates with a surrounding air filter chamber 34 provided by the terminal portion of the second air channel 32 to releasably secure the air filter 26 to the second air channel 32. Such a fastener may be a twist and lock or bayonet type fastener, or may be spring biased to normally maintain the air filter in an installed position. As such, the air filter 26 is disposed in a location that is easily accessible, and is adapted to be simply and quickly removed and replaced. Engine air flows through the second air channel 32 from the inlet 32a to the outlet 32b, and issues into the air filter chamber 34 that receives the air filter 26. The air flows radially through the cylindrical sidewall of the air filter 26, and relatively clean air flows axially, via the open end of the filter 26, to the engine air inlets.

Each of the first and second air channels 30, 32 extend through the front cowling 23 and into the gas tank assembly 24 so as to be relatively beneath a gas tank cover and alongside the gas tank. The channels 30, 32 then curve downwardly and inwardly toward the longitudinal axis 28 of the motorcycle 10. As will be readily appreciated, the first air channel 30 is longer than the second air channel 32 and is bent downwardly at a location relatively behind the gas tank assembly 24 so as to pass beneath the seat 18. The shorter, second air channel 32 terminates relatively beneath the gas tank assembly 24 so as to provide air to the engine air inlets disposed therebeneath.

The present invention has been described herein with particularity, but it is noted that the scope of the invention is not limited thereto. Rather, the present invention is considered to be possible of numerous modifications, alterations, and combinations of parts and, therefore, is only defined by the claims appended hereto.

What is claimed is:

1. A motorcycle comprising:
   a body including a front wheel, a rear wheel, an engine, a seat, a gas tank assembly and a radiator disposed rearward of the engine;
   a first air channel defining a first passageway extending through the body of the motorcycle, said first passageway having an inlet located on a first side of the motorcycle and an outlet communicating cooling air to the radiator; and,
   a second air channel defining a second passageway passing through the body of the motorcycle, said second passageway having an inlet located on a second side of the motorcycle and an outlet in communication with an engine air inlet, the second passageway inlet being located on a second side of the motorcycle, wherein the inlets for the first and second passageways are positioned in a substantially symmetrical manner at a front of the motorcycle.

2. The motorcycle according to claim 1, wherein the first passageway outlet is disposed rearward of the engine.

3. The motorcycle according to claim 2, wherein the radiator is disposed generally horizontally and the first passageway outlet is disposed adjacent said radiator such that air flowing from the first passageway outlet flows downwardly through the radiator.

4. The motorcycle according to claim 1, further comprising an air filter disposed relatively between the second passageway outlet and the engine air inlet.

5. The motorcycle according to claim 4, wherein the air filter is oriented transverse to a longitudinal axis of the motorcycle.

6. The motorcycle according to claim 5, wherein the air filter is cylindrical and includes a closed proximal end including a fastener to releasably secure the air filter to a terminal portion of the second air channel.

7. The motorcycle according to claim 6, wherein the first passageway outlet is disposed relatively rearward of the seat.

8. The motorcycle according to claim 7, wherein the radiator is disposed generally horizontally and the first passageway outlet is disposed adjacent said radiator such that air flowing frop the first passageway outlet flows downwardly through the radiator.

9. The motorcycle of claim 1, wherein a portion of the radiator is disposed rearward of the seat of the motorcycle, and wherein the first passageway outlet is disposed rearward of the seat.

10. A motorcycle comprising: a body including a front wheel, a rear wheel, a steering head, an engine, a seat, a radiator, and a gas tank assembly, said motorcycle having a longitudinal axis aligned with said front and rear wheels, said gas tank assembly being disposed relatively behind said front wheel and said steering head and relatively above said engine, said seat being disposed relatively behind said gas tank assembly and said radiator being disposed rearward of the gas tank and relatively below the seat, said motorcycle further comprising: an air management system for delivering air to the engine and radiator, said air management system comprising:
   a first air channel defining a first passageway extending through the body of the motorcycle, said first passageway having an inlet located on a first side of the motorcycle and an outlet through which cooling air flows to said radiator; and,
   a second air channel defining a second passageway passing through the body of the motorcycle, said second passageway having an inlet located on a second side of the motorcycle and an outlet in communication with an air inlet of the engine, the second passageway inlet being located on a second side of the motorcycle, wherein the inlets for the first and second passageways are positioned in a substantially symmetrical manner at a front of the motorcycle and relatively forward of the steering head.

11. The motorcycle according to claim 10 wherein the first passageway outlet is disposed rearward of the gas tank and relatively below the seat.

12. The motorcycle according to claim 11, wherein the radiator is disposed generally horizontally and the first passageway outlet is disposed vertically adjacent said radiator such that air flowing from the first passageway outlet flows downwardly through the radiator.

13. The motorcycle according to claim 10, further comprising an air filter disposed relatively between the second passageway outlet and the engine air inlet.

14. The motorcycle according to claim 13, wherein the air filter is oriented relatively transverse to the longitudinal axis of the motorcycle.

15. The motorcycle according to claim 14, wherein the air filter is cylindrical and includes a closed proximal end including a fastener to releasably secure the air filter to a terminal portion of the second air channel.

16. The motorcycle according to claim 15, wherein the first passageway outlet is disposed relatively rearward of the seat.

17. The motorcycle according to claim 16, wherein the radiator is disposed generally horizontally and the first passageway outlet is disposed adjacent said radiator such that air flowing from the first passageway outlet flows downwardly through the radiator.

* * * * *